April 14, 1953      M. L. BLONDET      2,635,219
VOLTAGE RECTIFICATION AND REGULATION POWER SYSTEM
Filed Jan. 18, 1951
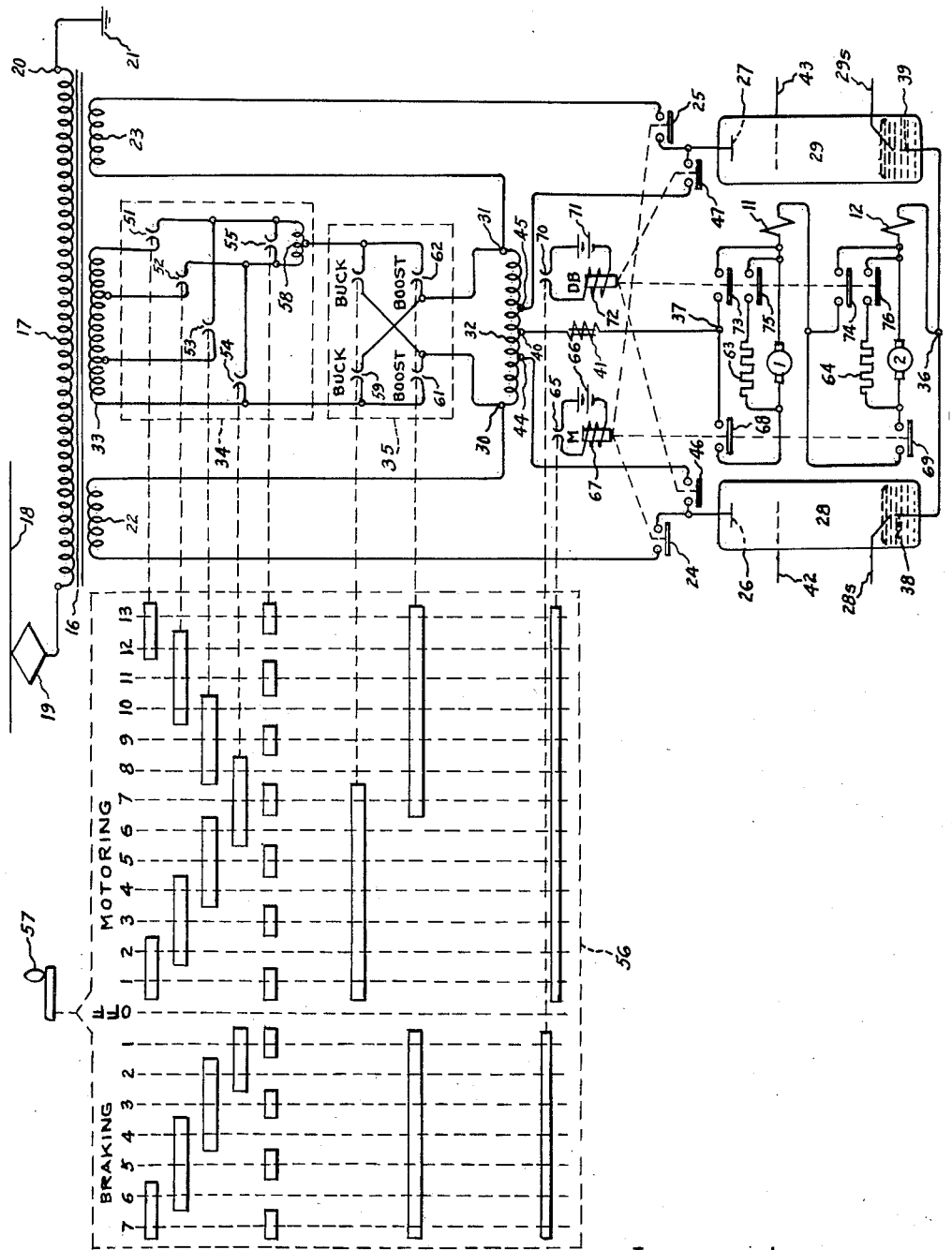
Inventor:
Maurice L. Blondet,
by Ernest C. Britton
His Attorney.

Patented Apr. 14, 1953

2,635,219

UNITED STATES PATENT OFFICE 2,635,219

VOLTAGE RECTIFICATION AND REGULATION POWER SYSTEM

Maurice L. Blondet, Versailles, France, assignor to General Electric Company, a corporation of New York Application January 18, 1951, Serial No. 206,548
In France February 14, 1950

10 Claims. (Cl. 318—274)

My invention relates to voltage rectification and regulation power systems and has particular significance in connection with transformer and rectifier connections for obtaining a variable voltage as for D.-C. type traction motors.

In numerous installations it is necessary to apply a variable voltage by means of rectifiers to electrical apparatus such as motors. For example, it is often desirable in a traction vehicle such as a locomotive to utilize traction motors of the D.-C. type in order to take advantage of their superior operating characteristics while, at the same time, utilizing rectifiers, for example, mercury vapor rectifiers, between motors and source of supply to the vehicle in order to take advantage of the desirable transmission characteristics of alternating current.

To start such a vehicle and regulate its speed, it would not be economical to feed each rectifier at a constant voltage and to insert between rectifier and motors a rheostatic equipment to vary the voltage impressed upon the motors. On the contrary, it is preferable to apply the output voltage of the rectifiers directly to the motors and to vary each rectifier output by varying its input. Heretofore it has been known to vary rectifier input by a tap-changing transformer or, when mercury vapor rectifiers are involved, to effect regulation by action of the rectifier grids. A disadvantage of the tap-changing method is that a large number of taps are required which complicates the transformer design and adds to the expense of the installation by requiring a large number of individual contactors. A disadvantage of grid control is that it will not permit fine regulation over considerable amplitude where large amounts of power are involved. Furthermore, neither tap changing nor grid control nor a combination of such conventional means lends itself readily to the realization of proper control of vehicle dynamic braking during which the motor excitation must be accurately controlled, although it is supplied from the rectifiers.

An object of the present invention is to provide a voltage rectification and regulation system, such as for a motor starting, running and braking control having a relatively large number of steps with only a relatively small number of circuit changing elements being utilized.

Broadly, the means employed in the embodiment herein illustrated and described comprises a static transformer having two like secondary windings each adapted to be connected through a different half-wave rectifier to produce rectification of different half-waves, and a third transformer secondary winding having variable taps. A reversing switch is provided connected to be energized through the variable taps and connected, in turn, to energize an autotransformer which, according to the position of the reversing switch, is adapted to buck or boost the half-waves from the first mentioned secondary windings so that the voltage impressed upon each rectifier may be readily varied from a value of substantially zero (with the windings bucking) to full voltage (with the windings boosting). During braking, excitation for the motor fields may readily be taken from the autotransformer (without the use of the first mentioned secondary windings) to provide a variable voltage adequately suited for dynamic braking action. This invention accordingly provides a voltage rectification and regulation system requiring, approximately, only one-fourth the number of taps and contactors which would be necessary in more conventional equipments.

Further objects and advantages will become apparent and my invention will be better understood from consideration of the following description taken in connection with the accompanying drawing which is a simplified schematic diagram of power and control circuits for an A.-C. trolley powered traction vehicle adapted to be propelled by D.-C. type series motors.

In the drawing, 1 and 2 represent D.-C. type traction motor armatures respectively associated with series type motor field windings 11 and 12. The vehicle is provided with a transformer 16 having a primary winding 17 adapted to be energized by a trolley line 18 through a pantograph 19 connected to one end of the primary winding, with the other end 20 thereof connected to a ground return circuit 21.

The main transformer 16 is provided with two identical secondary windings, 22 and 23 respectively, each having their outboard sides connected through contactor contacts 24 and 25, respectively, to anodes 26 and 27, respectively, of associated mercury vapor rectifiers 28 and 29, respectively. The identical secondaries 22 and 23 have their inboard sides connected to the extremities 30 and 31, respectively, of an autotransformer 32.

The transformer 16 is provided with a third secondary winding 33 provided with taps and tap-changing means indicated generally at 34 and hereinafter more fully described. Reversing switch means indicated generally at 35 are interposed between the tap-changing means 34 and the extremities 30 and 31 of autotransformer 32.

The load comprising the traction motors is connected between a pair of terminals 36 and 37, terminal 36 being connected to the cathodes 38 and 39, respectively, of the two rectifiers 28 and 29. Terminal 37 is connected to a center point 40 of the autotransformer 32 and, as shown in the drawing, a smoothing reactor 41 may be interposed in the circuit to de-emphasize the ripples of the rectified current.

Rectifiers 28 and 29 are shown provided with grids 42 and 43 respectively, and, if desired, these grids may be connected to conventional apparatus (not shown) so that they will function as protecting grids or regulating grids (or both) cojointly with the regulating arrangement which is the object of the present invention. It will be understood by those skilled in the art that starting electrodes 28s and 29s will ordinarily also be employed but their circuits are not shown as such circuits may be conventional and form no part of the present invention.

As shown in the drawing, the autotransformer 32 is further provided with symmetrical taps 44 and 45, each for securing only a portion of each half of the autotransformer voltage to supply, whenever a pair of braking contacts 46 and 47 are closed, the anodes 26 and 27 directly at low voltage without the use of secondary windings 22 and 23.

In the drawing I have shown the tapping means 34 comprising a plurality of cam-operated contacts 51—55 adapted to be operated from a master controller 56 provided with an operator's handle 57.

It should be understood that contacts operated directly by a hand operated master switch may not always be practical because of closing and opening duty limitations, but the arrangement disclosed is provided mainly for descriptive purposes for obviously the present invention includes numerous variations as where solenoid, pneumatic or motor operated circuit changing elements are included in the circuits of any or all of the circuit changing elements 51—55.

As shown in the drawing, in which the representation of controller 57 includes a developed view of cams, for the first step of motoring the full voltage of secondary winding 33 will be supplied to the reversing means 35, and then progressively less voltage will be supplied until the seventh step of motoring is reached, at which time the voltage supplied to the reversing means from winding 33 is zero.

In accordance with conventional practice, I have included in the tap changing means 34 a preventive coil 58 which serves to limit current surges and "sags," and also serves to reduce the number of contact units required for a given number of steps.

As shown in the drawing, the reversing switch means 35 comprises a plurality of four cam operated contacts, 59 and 60 being labeled "buck" since when closed (in positions 1–7 during motoring) they cause the voltage from winding 33 to buck that of the windings 22 and 23. The other two cam contacts 61 and 62 are labeled "boost" since when closed (in positions 7–13) they cause the opposite effect.

Dynamic braking resistors 63 and 64 are provided for the respective motor armatures. The master controller 57 is provided with a cam operated interlock 65 which through a battery 66 serves, during motoring, to energize a coil 67 of motoring contactor M, which, when picked up closes its contacts 24 and 25 already referred to.

Contactor M is provided with additional contacts 68 and 69 which place the motor armatures and series fields all in series across the points 36 and 37. The master controller is also provided with an interlock 70 which is closed during braking to provide energization, as from a battery 71, to a dynamic braking contactor coil 72 thereby to close DB contacts 46 and 47 and also DB contacts 73 and 74 to place the traction motor fields in series across the rectified source of supply appearing at points 36 and 37. At the same time, the DB contactor picking up closes additional DB contacts 75 and 76 to short circuit the traction motor armatures through the dynamic braking resistance grids 63 and 64, respectively.

It will be appreciated by those skilled in the art that the autotransformer 32 is merely used as a transformer means and, if desired, a transformer may be substituted for an autotransformer although an autotransformer may be found preferable from the standpoint of size of equipment required.

I have found it desirable to proportion the main transformer secondary windings so that the two like windings (22 and 23) each have a fixed number of turns corresponding approximately to one-half of the maximum voltage which is to be attained and the third secondary winding has a number of turns corresponding approximately to the maximum voltage which is to be attained. Thus, the reversing switch makes it possible to connect through the autotransformer the two halves of the voltage of the variable tap winding respectively in series, either to buck or to boost, with the secondaries having a fixed number of turns in such a way that, owing to operation of the tap-changing means of the common secondary and to the operation of the reversing switch, the supply voltage of the rectifiers of the two half-waves may be adjusted between a value equal to zero and the maximum value to be realized.

In operation of the system of the invention, during motoring (that is, during traction) the motor armatures and fields are connected between the terminals 36 and 37, contacts 24 and 25 are closed, and all DB contacts including 46 and 47 are open. It will be apparent from the cam development that for the first step of motoring the reversing switch means 35 is in the buck position and full voltage is applied through tap-changing means 34 (since only 51 and 55 are closed). With the proportions mentioned above, the voltage across each half of autotransformer 32 will be equal to the voltage across each of the identical secondary windings so that no voltage will be supplied to the rectifiers or to the motors. In the second position a small voltage will be applied; in the third position a greater voltage will be applied, and so on until at the seventh position tap contacts 54 and 55 serve to short circuit autotransformer 32 so that the full voltage of winding 22 is supplied to rectifier 28 and the full voltage of winding 23 is supplied to rectifier 29. The outline of the cams is such that during the changeover from buck to boost at position 7, autotransformer 32 is always in the short circuit state, permitting the changeover to take place without any interruption of a current-carrying circuit. Moreover, it will be apparent from the drawing that the equipment is provided with interlocking built in as a function of cam sequence to prevent reversing switch 35 from changing position unless the arrangement of tap-switching mechanism 34 is such that the voltage supplied by secondary 33 becomes zero.

On the eighth motoring position the reversing switch mechanism 35 has established the connections for boost and the voltage supplied to the terminals 30 and 31 is at a low value permitting the autotransformer to act as a booster so that the rectifier and motor voltages rise and the motors continue to accelerate. The remaining motoring positions 9–13 increase the voltage applied across terminals 30 and 31 until maximum voltage is applied to the motors 1 and 2.

To reduce the speed the engineer goes through the same operations, but in the opposite sense.

During braking operation, the equipment functions as follows: the armature circuits of the motors are closed upon the dynamic braking resistance grids and the motor fields in series are connected across terminals 36 and 37, contacts 24 and 25 are opened and DB contacts 46 and 47 are closed and the tap-switching is gradually stepped up from a low voltage, at braking position 2 where 53 and 54 are closed, to the full braking voltage position with interlocks 51 and 55 closed to increase the field current of the motors and thereby take full advantage of the maximum allowable armature current during braking by compensating for reduced motor armature generated voltage due to decreasing vehicle speed.

During braking operation, the half secondaries 22 and 23 are not in circuit and, consequently, it might seem immaterial whether reversing switch 35 is in the buck or in the boost position. However, each ignitor fires once each cycle and a half cycle apart, and in order to keep the anode voltage in phase with the firing, the reversing switch is in the so-called "boost" position (for braking) as indicated by the cam development shown. Taps 44 and 45 on the autotransformer 32 are so chosen that the maximum desired excitation current of the motors corresponds to the voltage supplied at the last braking position of the controller.

There is thus provided a device of the character described meeting the objects hereinabove set forth and providing a scheme of rectifier voltage regulation employing a minimum number of tap-changing switches for a maximum number of voltage steps. It will be apparent that with the system of the invention the number of tap-changing switches is reduced to nearly one-fourth, since the number of switches required is reduced by substantially one-half through the use of the reversing switch means and is further reduced by substantially one half by using the same tap changing means to effect the voltage for each half-wave circuit, thus making possible very considerable savings in equipment and in wiring, particularly where dynamic braking is to be provided since a ready source of low voltage dynamic braking excitation is made readily available.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. In a voltage rectifying and regulating system, the combination of a first transformer means including two identical secondary windings and a third transformer secondary winding having a plurality of taps for selectively deriving a plurality of different voltages therefrom, a second transformer means selectively connected for energization from said third secondary winding taps, reversing switch means interposed between said third secondary winding and said second transformer means for reversing the phase of the voltage applied thereto, a plurality of rectifying means, a load circuit, and means for respectively connecting said load circuit to said identical secondary windings through said rectifying means and through said second transformer means whereby the voltage across said load circuit may be varied between zero and a maximum value by the selection of said third secondary taps and the position of said reversing switch means.

2. In a voltage rectifying and regulating system the combination of a main transformer including two identical secondary windings and a third secondary winding having a plurality of taps, tap-changing means associated with said third transformer winding taps for selectively deriving a plurality of different voltages therefrom, an autotransformer connected to be energized from said third secondary winding in accordance with the position of said tap-changing means, a reversing switch interposed between said tap-changing means and said autotransformer for reversing the phase of the voltage applied thereto, a pair of rectifying means, a load circuit, and means for connecting said identical secondary windings respectively in circuit with said rectifiers, said load circuit, and said autotransformer for supplying said load circuit with rectified direct current at a voltage determined by operation of said tap-changing means and said reversing switch.

3. In a voltage rectifying and regulating system the combination of a main transformer including two identical secondary windings and a third secondary winding having taps, tap-changing means associated with said third transformer winding taps for selectively deriving a plurality of different voltages therefrom, an autotransformer connected to be energized from said third secondary winding in accordance with the position of said tap-changing means, a reversing switch interposed between said tap-changing means and said autotransformer for reversing the phase of the voltage applied thereto, a pair of rectifying means, a load circuit connected to the midpoint of said autotransformer, and means for respectively connecting said identical secondary windings and said rectifiers in circuit with said load circuit for supplying said load circuit with rectified direct current, said reversing switch causing the voltage applied to said autotransformer as selected by said tap-changing means to selectively buck or boost the voltage supplied by said identical secondary windings to said rectifiers so that the voltage across said load circuit may be adjusted between zero and a maximum value.

4. An electrical system for an alternating current trolley vehicle utilizing direct-current traction motors comprising a main transformer having a trolley-energized primary winding with two identical secondary windings and a third secondary winding having a plurality of taps, tap-changing means associated with said third secondary winding taps for selectively deriving a plurality of different voltages therefrom, an autotransformer connected to be energized from said third secondary winding in accordance with the position of said tap-changing means, a reversing switch interposed between said tap-changing means and said autotransformer for reversing the phase of the voltage applied thereto, a pair of rectifiers, means for connecting at least one of the said motors in circuit with the mid point of said autotransformer, means for respectively connecting said identical secondary windings in circuit with said rectifiers and said motor for supplying said motor with rectified direct current, operation of said reversing switch causing the voltage applied to said autotransformer as selected by said tap-changing means to selectively buck or boost the voltage supplied by said secondary windings whereby the voltage applied to said motor may be adjusted between zero and a maximum value, and means for selectively applying dynamic braking to said motor comprising means for connecting a field winding of said motor for energization by said rectifiers and means for disconnecting said rectifiers from said identical secondary windings and for reconnecting said rectifiers in circuit with a portion of said autotransformer.

5. An electrical system for an alternating current trolley vehicle having a direct-current traction motor comprising a main transformer having a trolley-energized primary winding with two identical secondary windings and a third secondary winding having a plurality of taps, tap-changing means associated with said third secondary winding taps for selectively deriving a plurality of different voltages therefrom, an autotransformer connected to be energized from said third secondary winding according to the position of said tap-changing means, a reversing switch interposed between said tap-changing means and said autotransformer for reversing the phase of the voltage applied thereto, a pair of rectifiers, means for connecting at least one motor to the mid point of said autotransformer, means for respectively connecting said identical secondary windings in circuit with said rectifiers and said motor to provide a motoring circuit whereby said motor is supplied with rectified direct current, operation of said reversing switch causing the voltage across said autotransformer as selected by said tap-changing means to selectively buck or boost the voltage across said identical secondary windings whereby the voltage applied to said motor may be varied from zero to a maximum amount, and means for respectively connecting said rectifiers in circuit with a field winding of said motor and a portion of said autotransformer to provide a dynamic braking circuit.

6. In combination, first transformer means including two identical transformer secondary windings adapted to produce a voltage substantially one-half the maximum to be obtained, said transformer having a third secondary winding adapted to produce substantially the maximum voltage to be obtained and having a plurality of taps for selectively deriving a plurality of different voltages therefrom, second transformer means selectively connected for energization from said third secondary winding taps, reversing switch means interposed between said third secondary winding taps and said second transformer means for reversing the phase of the voltage applied thereto, a commutator type motor having an armature and a field winding, means for connecting said armature and said field winding in series with the mid point of said second transformer means, a pair of rectifiers, and means for respectively connecting said rectifiers in series with said identical secondary windings and said motor armature and field winding so that said motor is supplied with rectified direct current, operation of said reversing switch causing the voltage across said autotransformer as determined by said third secondary winding taps to selectively buck or boost the voltage across said identical secondary windings whereby the voltage applied to said motor may be varied from zero to a maximum amount.

7. In combination, first transformer means including two identical transformer secondary windings adapted to produce a voltage substantially one-half the maximum to be obtained, said transformer having a third secondary winding adapted to produce substantially the maximum voltage to be obtained and having a plurality of taps for selectively deriving a plurality of different voltages therefrom, second transformer means selectively connected for energization from said third secondary winding taps, reversing switch means interposed between said third secondary winding taps and said second transformer means for reversing the phase of the voltage applied thereto, a commutator type motor having an armature and a field winding, a pair of rectifiers, means for connecting said armature and said field winding in series with the mid point of said second transformer means, means for respectively connecting said rectifiers in series with said identical secondary windings and said armature and field winding to provide a motoring connection, a dynamic braking resistance; and means for providing a dynamic braking circuit including means for connecting said resistance across said armature, means for connecting said field winding in series with said second transformer mid point, and means for respectively connecting said rectifiers in series with a portion of said second transformer and said field winding.

8. In a voltage rectifying and regulating system, a combination of a transformer including two identical secondary windings having a like number of turns and a third winding having a number of turns substantially double the number of turns of each of said identical secondary windings, said third secondary winding having a plurality of taps for selectively deriving a plurality of different voltages, an autotransformer selectively connected for energization from said third secondary winding taps, a reversing switch interposed between said autotransformer and said third secondary winding taps for reversing the phase of the voltage applied thereto, each of said identical secondary windings having one end connected to an end of said autotransformer, said reversing switch selectively connecting said autotransformer to buck or boost said identical secondary windings, a pair of half wave rectifiers respectively arranged in series with the other ends of said identical secondary windings, and a load circuit connected in series with the mid point of said autotransformer and said rectifiers whereby the voltage across said load may be varied from zero to a maximum value dependent upon the selection of said third secondary winding taps and the position of said reversing switch.

9. An electrical system for an alternating current trolley vehicle having commutator type traction motors comprising a main transformer having a primary winding energized from said trolley with two identical secondary windings having a like number of turns and a third secondary winding having a number of turns substantially double the number of turns of each of said identical secondary windings, said third secondary winding having a plurality of taps for selectively deriving a plurality of different voltages therefrom, an autotransformer connected for energization from said third secondary winding taps, a reversing switch interposed between said autotransformer and said third secondary winding taps for reversing the phase of the voltage applied thereto, each of said identical secondary windings having one end respectively connected to an end of said autotransformer, said reversing switch selectively connecting said autotransformer to buck or boost said identical secondary windings, a pair of half wave rectifiers, circuit connecting means for connecting at least one of said motors in series with the mid point of said autotransformer and for respectively connecting said rectifiers in series with the other ends of said identical secondary windings and with said motor to provide a motoring circuit whereby the voltage applied to said motor may be varied from zero to a maximum value dependent on the selection of said taps and the position of said reversing switch, and circuit connecting means for connecting a field of said motor in series with the mid point of said autotransformer and for respectively connecting said rectifiers in series with portions of said autotransformer and with said motor field for providing a dynamic braking circuit.

10. An electrical system for an alternating current trolley vehicle having commutator type traction motors comprising a main transformer having a primary winding energized from said trolley with two identical secondary windings having a like number of turns and a third secondary winding having a number of turns substantially double the number of turns of each of said identical secondary windings, said third secondary winding having a plurality of taps for selectively deriving a plurality of different voltages therefrom, an autotransformer selectively connected for energization from said third secondary winding taps, a reversing switch interposed between said autotransformer and said third secondary winding taps for reversing the phase of the voltage applied thereto, each of said identical secondary windings having one end respectively connected to an end of said autotransformer, said reversing switch selectively connecting said autotransformer to buck or boost said identical secondary windings, a pair of half way rectifiers, circuit connecting means for connecting at least one of said motors in series with the mid point of said autotransformer and for respectively connecting said rectifiers in series with the other ends of said identical secondary windings and with said motor to provide a motor circuit whereby the voltage applied to said motor may be varied from zero to a maximum value dependent on the selection of said taps and the position of said reversing switch, and interlocking means arranged to prevent operation of said reversing switch from one position to the other except when the voltage applied to said autotransformer from said third secondary winding taps is substantially zero.

MAURICE L. BLONDET.

References Cited in the file of this patent

UNITED STATES PATENTS

| Number | Name | Date |
|---|---|---|
| 1,072,042 | Schmidt | Sept. 2, 1913 |
| 2,095,773 | Taliaferro | Oct. 12, 1937 |